US006176705B1

(12) United States Patent
Garvey et al.

(10) Patent No.: US 6,176,705 B1
(45) Date of Patent: Jan. 23, 2001

(54) SOLAR SYSTEM TEACHING AID

(76) Inventors: Shawn Garvey; Frank Contaldi, both of 16 Grand Ave., Lynbrook, NY (US) 11563

( * ) Notice: Under 35 U.S.C. 154(b), the term of this patent shall be extended for 0 days.

(21) Appl. No.: 09/405,664

(22) Filed: Sep. 24, 1999

(51) Int. Cl.[7] .............................. G09B 23/00; A63H 3/00
(52) U.S. Cl. .............................................. 434/284; 446/76
(58) Field of Search ..................................... 434/284, 287, 434/288, 290, 291, 292; 446/73, 75, 76, 310, 311; 428/11

(56) References Cited

U.S. PATENT DOCUMENTS

| | | | |
|---|---|---|---|
| D. 189,821 | * 2/1961 | Lyon ................................... D34/16.5 |
| 2,226,032 | * 12/1940 | Wahlberg ............................. 434/291 |
| 2,382,643 | * 8/1945 | Lafferty ................................ 434/287 |
| 2,418,718 | * 4/1947 | Maginley ............................. 434/291 |
| 3,242,595 | * 3/1966 | Eastman ............................... 434/291 |
| 3,520,073 | * 7/1970 | Baader ................................. 434/288 |
| 3,733,720 | * 5/1973 | Byers ................................... 434/291 |
| 4,173,667 | * 11/1979 | Rusch ..................................... 428/11 |
| 4,392,831 | * 7/1983 | Schubert ............................. 434/291 |
| 4,400,162 | * 8/1983 | Rustemis ............................. 434/291 |
| 4,437,713 | * 3/1984 | Roach ................................. 312/259 |
| 4,713,011 | * 12/1987 | Alnafissa ............................. 434/292 |
| 4,752,228 | * 6/1988 | Masunaga ............................ 434/131 |
| 4,964,831 | * 10/1990 | Wolff ..................................... 446/75 |
| 5,967,791 | * 10/1999 | Abrahamian ........................ 434/291 |

* cited by examiner

Primary Examiner—Jacob K. Ackun
Assistant Examiner—Kurt Fernstrom

(57) ABSTRACT

A solar system teaching aid for teaching relationships between astral bodies of the solar system. The solar system teaching aid includes a bracket having a securing means. The securing means is adapted for securing the bracket to the ceiling. A plurality of hooks extend downward from the bracket. The hooks are spaced apart. A plurality of astral body assemblies each have an orb portion and a hanging means. The hanging means is coupled to the orb portion. The hanging means is for hanging the orb portion from an associated hook.

8 Claims, 5 Drawing Sheets

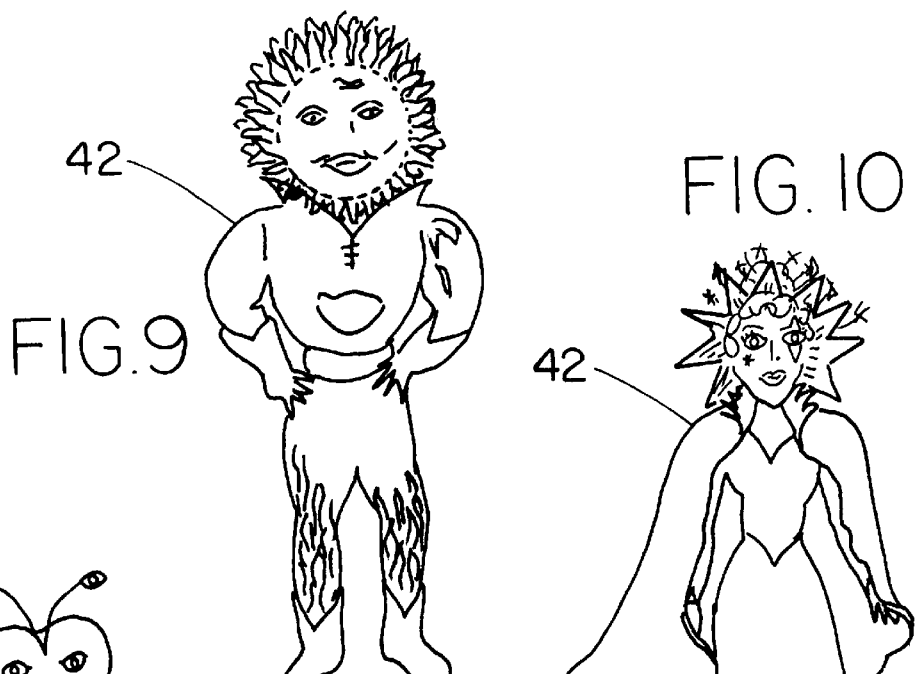
FIG. 9
FIG. 10
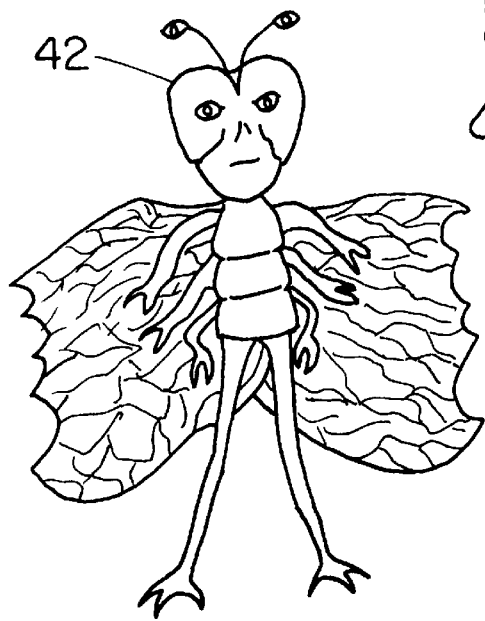
FIG. 11
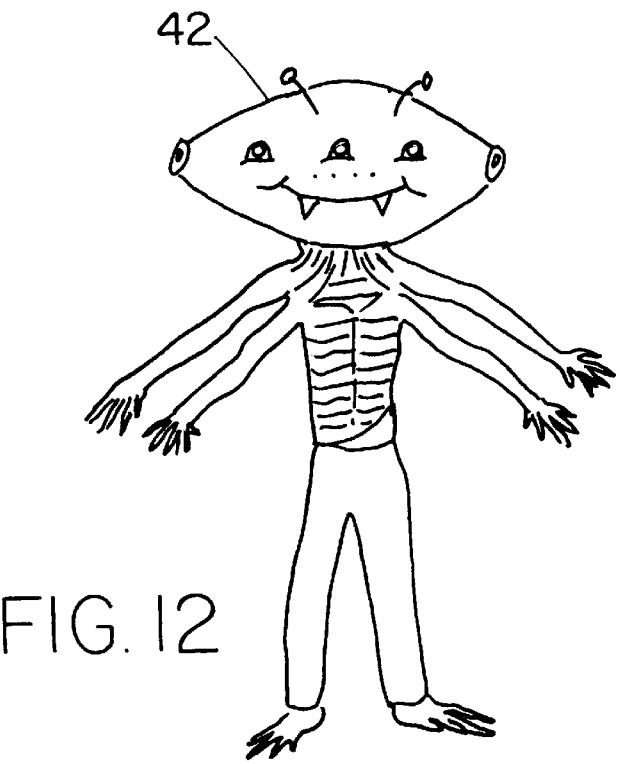
FIG. 12

SOLAR SYSTEM TEACHING AID

BACKGROUND OF THE INVENTION

1. Field of the Invention

The present invention relates to solar system models and more particularly pertains to a new solar system teaching aid for teaching relationships between astral bodies of the solar system.

2. Description of the Prior Art

The use of solar system models is known in the prior art. More specifically, solar system models heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new solar system teaching aid. The inventive device includes a bracket having a securing means. The securing means is adapted for securing the bracket to the ceiling. A plurality of hooks extend downward from the bracket. The hooks are spaced apart. A plurality of astral body assemblies each have an orb portion and a hanging means. The hanging means is coupled to the orb portion. The hanging means is for hanging the orb portion from an associated hook.

In these respects, the solar system teaching aid according to the present invention substantially departs from the conventional concepts and designs of the prior art, and in so doing provides an apparatus primarily developed for the purpose of teaching relationships between astral bodies of the solar system.

SUMMARY OF THE INVENTION

In view of the foregoing disadvantages inherent in the known types of solar system models now present in the prior art, the present invention provides a new solar system teaching aid construction wherein the same can be utilized for teaching relationships between astral bodies of the solar system.

The general purpose of the present invention, which will be described subsequently in greater detail, is to provide a new solar system teaching aid apparatus and method which has many of the advantages of the solar system models mentioned heretofore and many novel features that result in a new solar system teaching aid which is not anticipated, rendered obvious, suggested, or even implied by any of the prior art solar system models, either alone or in any combination thereof.

To attain this, the present invention generally comprises a bracket having a securing means. The securing means is adapted for securing the bracket to the ceiling. A plurality of hooks extend downward from the bracket. The hooks are spaced apart. A plurality of astral body assemblies each have an orb portion and a hanging means. The hanging means is coupled to the orb portion. The hanging means is for hanging the orb portion from an associated hook.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar system teaching aid apparatus and method which has many of the advantages of the solar system models mentioned heretofore and many novel features that result in a new solar system teaching aid which is not anticipated, rendered obvious, suggested, or even implied by any of the prior art solar system models, either alone or in any combination thereof.

It is another object of the present invention to provide a new solar system teaching aid which may be easily and efficiently manufactured and marketed.

It is a further object of the present invention to provide a new solar system teaching aid which is of a durable and reliable construction.

An even further object of the present invention is to provide a new solar system teaching aid which is susceptible of a low cost of manufacture with regard to both materials and labor, and which accordingly is then susceptible of low prices of sale to the consuming public, thereby making such solar system teaching aid economically available to the buying public.

Still yet another object of the present invention is to provide a new solar system teaching aid which provides in the apparatuses and methods of the prior art some of the advantages thereof, while simultaneously overcoming some of the disadvantages normally associated therewith.

Still another object of the present invention is to provide a new solar system teaching aid for teaching relationships between astral bodies of the solar system.

Yet another object of the present invention is to provide a new solar system teaching aid which includes a bracket having a securing means. The securing means is adapted for securing the bracket to the ceiling. A plurality of hooks extend downward from the bracket. The hooks are spaced apart. A plurality of astral body assemblies each have an orb portion and a hanging means. The hanging means is coupled to the orb portion. The hanging means is for hanging the orb portion from an associated hook.

Still yet another object of the present invention is to provide a new solar system teaching aid that teaches the relationships in location of the astral bodies and the characteristics of the individual astral bodies.

Even still another object of the present invention is to provide a new solar system teaching aid that fosters the curiosity of a child's curiosity of space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an elevational view of the doll associated with the astral body assembly associated with the sun of the present invention.

FIG. 10 is an elevational view of the doll associated with the astral body assembly associated with venus of the present invention.

FIG. 11 is an elevational view of the doll associated with the astral body assembly associated with jupiter of the present invention.

FIG. 12 is an elevational view of the doll associated with the astral body assembly associated with uranus of the present invention.

DESCRIPTION OF THE PREFERRED EMBODIMENT

Figure 1:
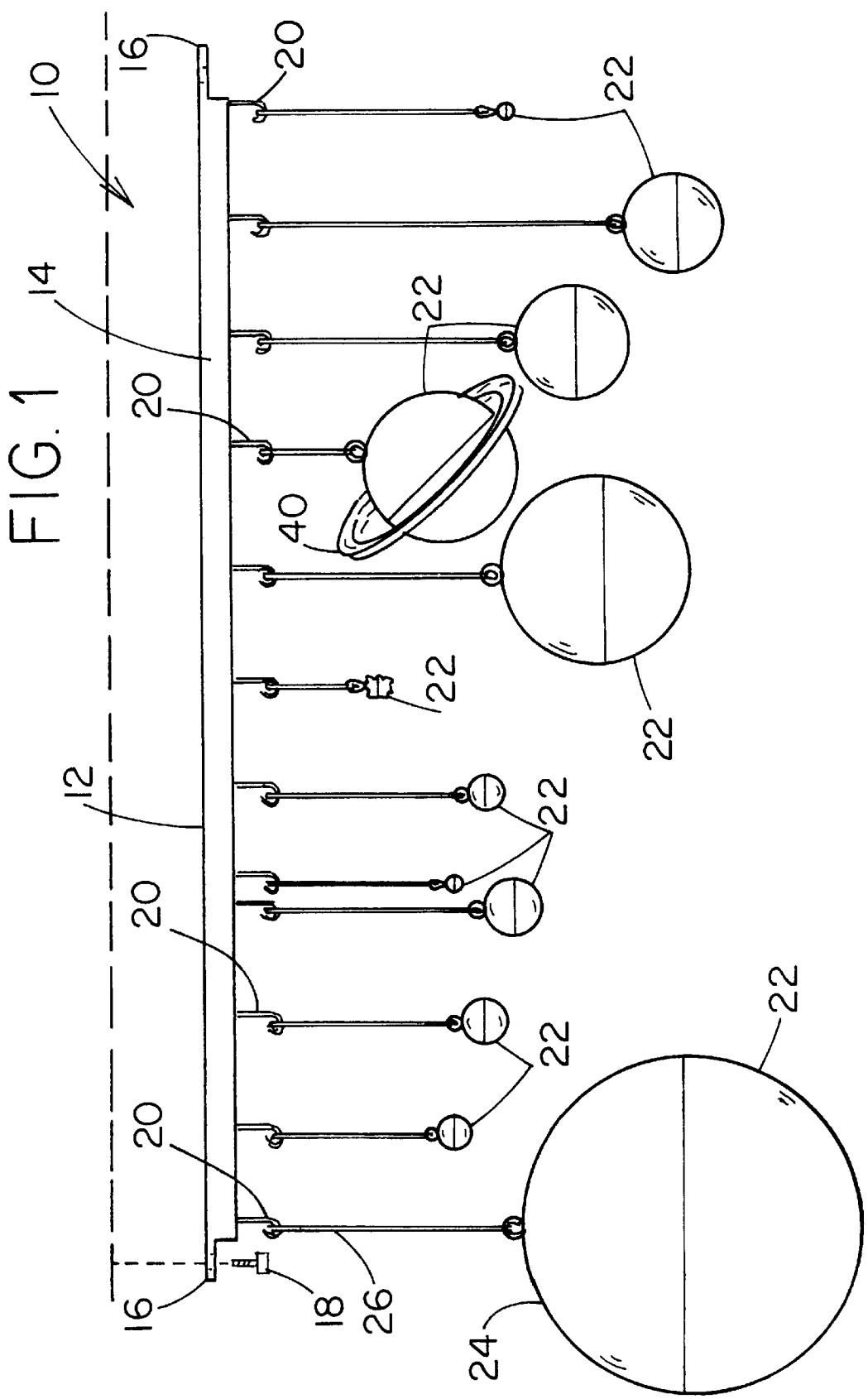
FIG. 1 is an elevational view of a new solar system teaching aid according to the present invention.

With reference now to the drawings, and in particular to FIGS. 1 through 13 thereof, a new solar system teaching aid embodying the principles and concepts of the present invention and generally designated by the reference numeral 10 will be described.

As best illustrated in FIGS. 1 through 13, the solar system teaching aid 10 generally comprises a bracket 12 having a base 14 portion and a pair of tabs 16. One of the tabs is coupled to a first end of the base portion. The other of the tabs is coupled to a second end of the base portion. Each of the tabs has a bore therethrough;

A plurality of securing means 18 are adapted for securing the bracket to the ceiling. Each of the securing means is for passing through the bores of the tabs. A plurality of hooks 20 extend downward from the base portion of the bracket. The hooks are linearly spaced apart.

Figure 2:
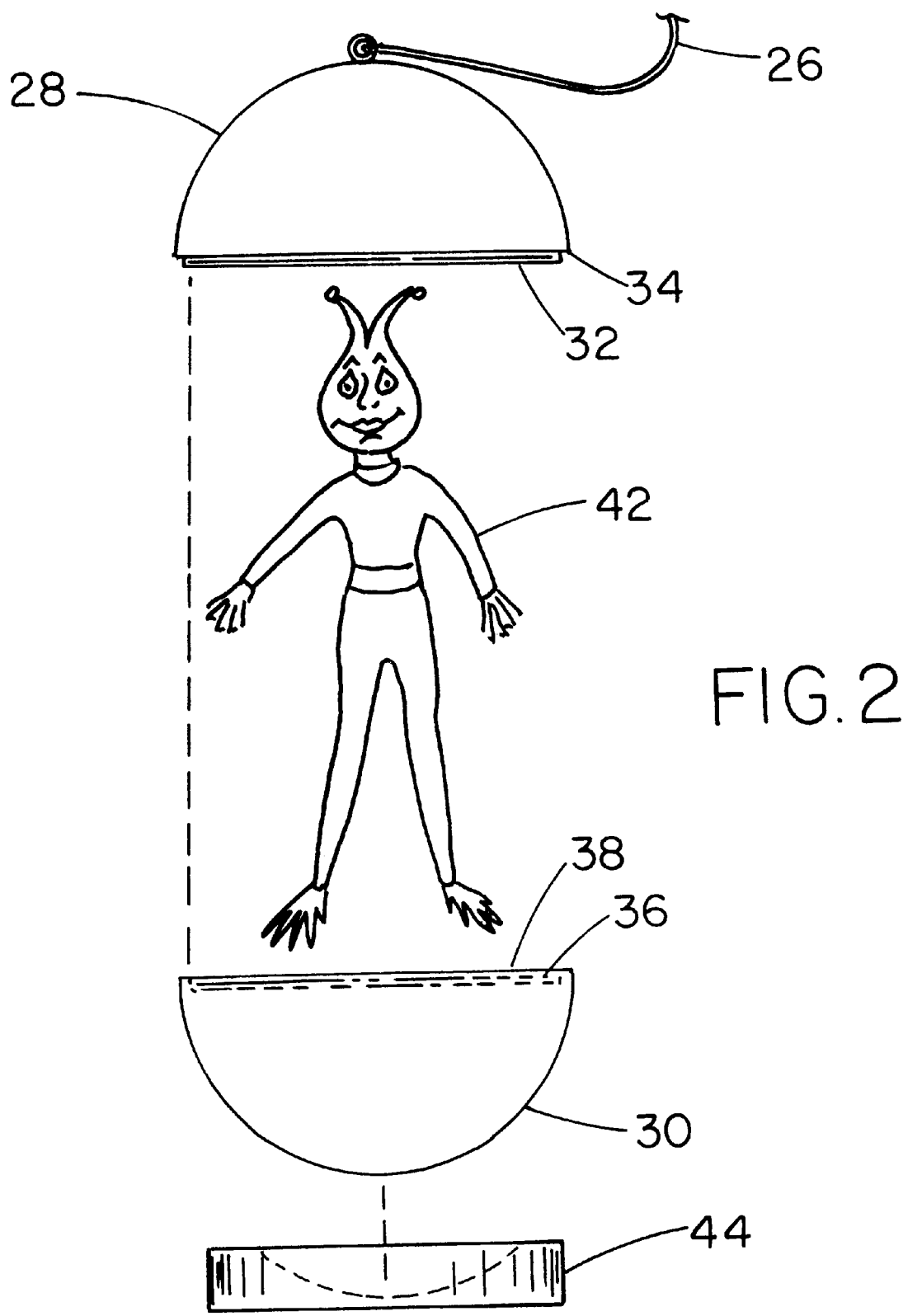
FIG. 2 is an exploded view of the astral body assembly and doll associated with pluto of the present invention.
Figure 3:
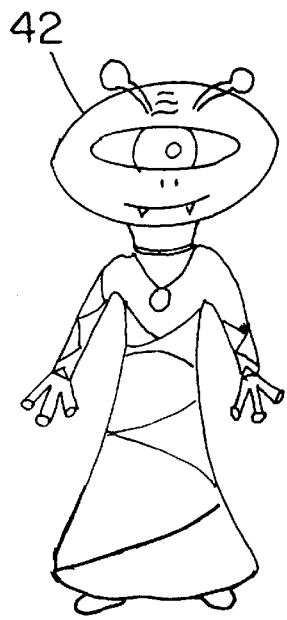
FIG. 3 is an elevational view of the doll associated with the astral body assembly associated with the moon of the present invention.
Figure 4:
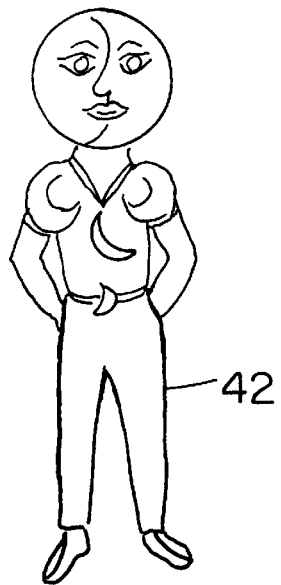
FIG. 4 is an elevational view of the doll associated with the astral body assembly associated with mars of the present invention.
Figure 5:
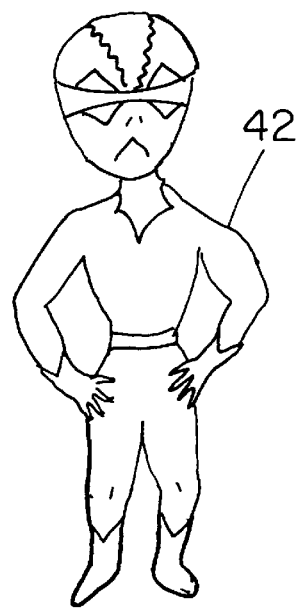
FIG. 5 is an elevational view of the doll associated with the astral body assembly associated with mercury of the present invention.
Figure 6:
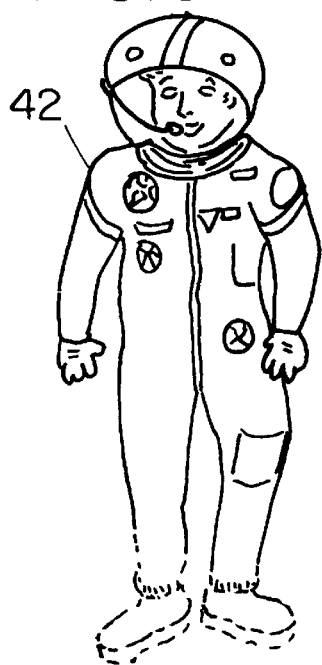
FIG. 6 is an elevational view of the doll associated with the astral body assembly associated with earth of the present invention.
Figure 7:
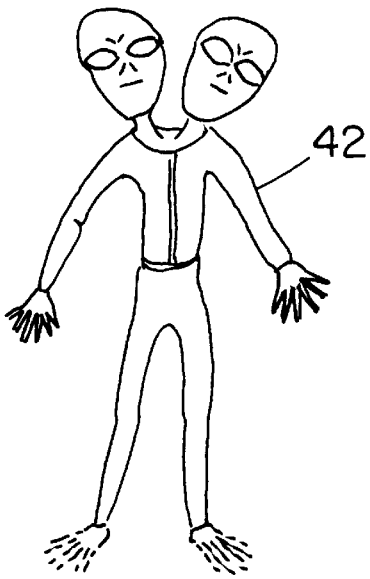
FIG. 7 is an elevational view of the doll associated with the astral body assembly associated with neptune of the present invention.
Figure 8:
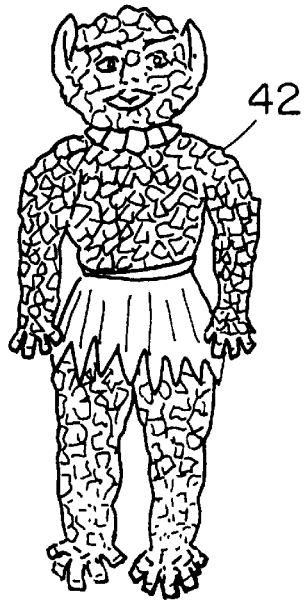
FIG. 8 is an elevational view of the doll associated with the astral body assembly associated with an asteroid of the present invention.
Figure 13:
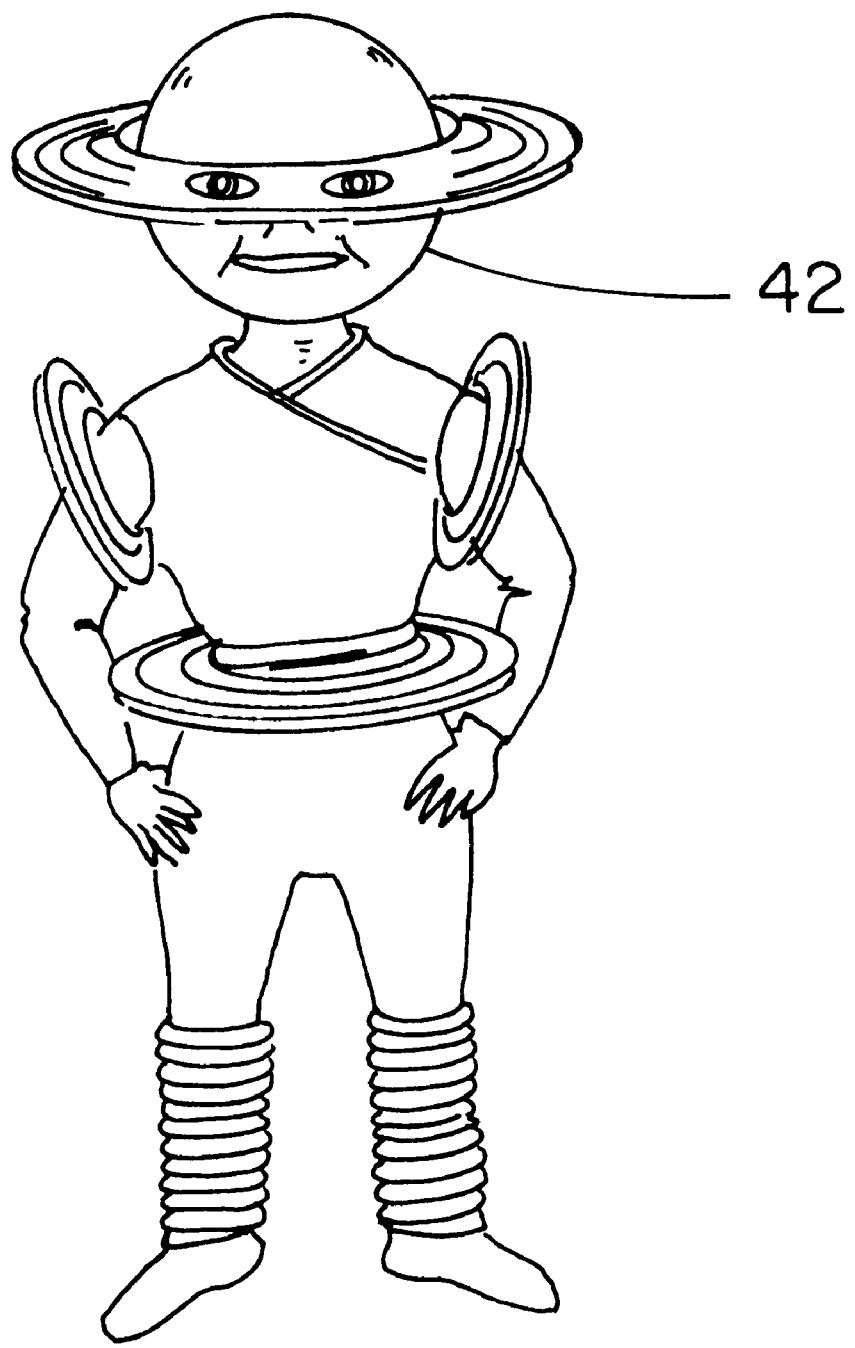
FIG. 13 is an elevational view of the doll associated with the astral body assembly associated with saturn of the present invention.

As shown in FIGS. 1 and 2, a plurality of astral body assemblies 22 have an orb portion 24 and a hanging means 26. The hanging means is coupled to the orb portion. The hanging means is for hanging the orb portion from an associated hook. The orb portion comprises an upper hemispherical shell 28 and a lower hemispherical shell 30. The upper shell is releasably coupled to the lower shell for defining a space therebetween. The upper shell has a threaded flange 32 extending downward from a bottom edge 34 of the upper shell. The lower shell has a threaded portion 36 proximate an upper edge 38 of the lower shell. The threaded portion of the lower shell is for receiving the threaded flange of the upper shell. Each orb portion is associated with an astral body selected from the group of astral bodies consisting of sun, mercury, venus, earth, moon, mars, asteroid, jupiter, saturn, uranus, neptune and pluto. The orb portion associated with saturn has a plurality of rings 40 coupled to the lower shell for radially extending around the orb portion.

As shown in FIGS. 2 through 12, a plurality of dolls 42 for are for being confined within the space defined by the upper shell and the lower shell of the associated orb portion. Each of the dolls has distinctive features corresponding to the associated astral body of the orb portion, each of the dolls is comprised of a flexible non-elastomeric material.

Also provided is a disc shaped base portion 44 having an indention for receiving the lower shell of the astral body assembly when the astral body assembly is removed from the associated hook.

In use, the bracket is secured to the ceiling of a child's room. The astral body assemblies are hung from the hooks in an appropriate order corresponding to the arrangement of the astral bodies of the solar system. Each astral body assembly would have an internal space for holding an alien doll associated with the astral body assembly it was removed from. For instance the astral body assembly associated with earth would have a doll of a human therein. The child would then study the position and relationship between astral bodies upon returning the astral body assemblies to the associated hook.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A solar system teaching aid for hanging from a ceiling for aiding a child in learning about the solar system, the teaching aid comprising:
   a bracket having a securing means, said securing means adapted for securing said bracket to the ceiling;
   a plurality of hooks extending downward from said bracket, said hooks being spaced apart;
   a plurality of astral body assemblies having an orb portion and a hanging means, said hanging means being coupled to said orb portion, said hanging means being for hanging said orb portion from an associated hook;
   wherein said orb portion comprises an upper hemispherical shell and a lower hemispherical shell, said upper shell being releasably coupled to said lower shell defining a space therebetween;
   wherein each said orb portion is associated with an astral body selected from the group of astral bodies consisting of Sun, Mercury, Venus, Earth, moon, Mars, asteroid, Jupiter, Saturn, Uranus, Neptune and Pluto; and
   a plurality of dolls for positioning in said space defined by said upper shell and said lower shell, each of said dolls having distinctive features corresponding to said associated astral body of said orb portion.

2. The teaching aid as set forth in claim 1 wherein said bracket has a base portion and a pair of tabs, one of said tabs is coupled to a first end of said base portion, other of said tabs being coupled to a second end of said base portion.

3. The teaching aid as set forth in claim 2 wherein each of said tabs has a bore therethrough.

4. The teaching aid as set forth in claim 3 wherein said securing means comprises a screw for securing to the ceiling through said bore of said tabs.

5. The teaching aid as set forth in claim 1 wherein said upper shell has a threaded flange extending downward from a bottom edge of said upper shell, said lower shell having a threaded portion proximate an upper edge of said lower shell, said threaded portion of said lower shell being for receiving said threaded flange of said upper shell.

6. The teaching aid as set forth in claim 1 wherein said orb portion associated with Saturn has a plurality of rings coupled to said lower shell for radially extending around said orb portion.

7. The teaching aid as set forth in claim 1 further comprising a base portion for supporting said astral body assemblies when said astral body assemblies are removed from said associated hooks.

8. A solar system teaching aid for hanging from a ceiling for aiding a child in learning about the solar system, the teaching aid comprising:
   a bracket having a base portion and a pair of tabs, one of said tabs being coupled to a first end of said base portion, the other of said tabs being coupled to a second end of said base portion, each of said tabs having a bore therethrough;
   a plurality of securing means adapted for securing said bracket to the ceiling, each of said securing means being for passing through said bores of said tabs;
   a plurality of hooks extending downward from said base portion of said bracket, said hooks being linearly spaced apart;
   a plurality of astral body assemblies having an orb portion and a hanging means, said hanging means being coupled to said orb portion, said hanging means being for hanging said orb portion from an associated hook, said orb portion comprises an upper hemispherical shell and a lower hemispherical shell, said upper shell being releasably coupled to said lower shell for defining a space therebetween, said upper shell having a threaded flange extending downward from a bottom edge of said upper shell, said lower shell having a threaded portion proximate an upper edge of said lower shell, said threaded portion of said lower shell being for receiving said threaded flange of said upper shell, each said orb portion being associated with an astral body selected from the group of astral bodies consisting of Sun, Mercury, Venus, Earth, moon, Mars, asteroid, Jupiter, Saturn, Uranus, Neptune and Pluto, said orb portion associated with Saturn having a plurality of rings coupled to said lower shell for radially extending around said orb portion; and
   a plurality of dolls for being confined within said space defined by said upper shell and said lower shell, each of said dolls having distinctive features corresponding to said associated astral body of said orb portion, each of said dolls comprising of a flexible non-elastomeric material.

* * * * *